(12) United States Patent
Wang

(10) Patent No.: US 9,736,477 B2
(45) Date of Patent: Aug. 15, 2017

(54) PERFORMING VIDEO ENCODING MODE DECISION BASED ON MOTION ACTIVITY

(71) Applicant: ATI Technologies ULC, Markham (CA)

(72) Inventor: Jiao Wang, Richmond Hill (CA)

(73) Assignee: ATI TECHNOLOGIES ULC, Markham, Ontario (CA)

( * ) Notice: Subject to any disclaimer, the term of this patent is extended or adjusted under 35 U.S.C. 154(b) by 862 days.

(21) Appl. No.: 14/021,185

(22) Filed: Sep. 9, 2013

(65) Prior Publication Data

US 2015/0071339 A1  Mar. 12, 2015

(51) Int. Cl.
| | |
|---|---|
| *H04N 19/109* | (2014.01) |
| *H04N 19/137* | (2014.01) |
| *H04N 19/176* | (2014.01) |
| *H04N 19/40* | (2014.01) |
| *H04N 19/59* | (2014.01) |
| H04N 19/147 | (2014.01) |
| H04N 19/19 | (2014.01) |

(52) U.S. Cl.
CPC ......... *H04N 19/109* (2014.11); *H04N 19/137* (2014.11); *H04N 19/176* (2014.11); *H04N 19/40* (2014.11); *H04N 19/59* (2014.11); *H04N 19/147* (2014.11); *H04N 19/19* (2014.11)

(58) Field of Classification Search
CPC .. H04N 19/109; H04N 19/137; H04N 19/176; H04N 19/40; H04N 19/59; H04N 19/147; H04N 19/19
USPC .................................................. 375/240.02
See application file for complete search history.

(56) References Cited

U.S. PATENT DOCUMENTS

| | | | |
|---|---|---|---|
| 7,412,003 B2* | 8/2008 | Fernandes ............... | H04N 19/40 |
| | | | 348/402.1 |
| 2003/0072368 A1* | 4/2003 | Chan ...................... | H04N 19/51 |
| | | | 375/240.12 |
| 2006/0133500 A1* | 6/2006 | Lee ......................... | H04N 19/56 |
| | | | 375/240.16 |
| 2013/0148940 A1* | 6/2013 | Schmit ................. | G11B 27/005 |
| | | | 386/230 |

(Continued)

OTHER PUBLICATIONS

Wiegand et al. Overview of the H.264 / AVC Video Coding Standard, IEEE Transactions on Circuits and Systems for Video Technology, Jul. 2003, pp. 1-19.

(Continued)

*Primary Examiner* — William C Vaughn, Jr.
*Assistant Examiner* — Jae N Noh
(74) *Attorney, Agent, or Firm* — Volpe and Koenig, P.C.

(57) ABSTRACT

A method and apparatus are described for performing video encoding mode decisions. A down-scaled frame is received that includes a macroblock corresponding to a first subset of macroblocks of a first area in a full-scale frame. A first average motion vector is calculated for the first subset of macroblocks, and a second average motion vector is calculated for a second subset of macroblocks of a second area surrounding the first subset of macroblocks. A comparison of a threshold to a distance measure between absolute values of the first and second average motion vectors is performed. A prediction mode for the macroblock in the down-scaled frame is determined based on the comparison to generate predicted blocks.

18 Claims, 5 Drawing Sheets

(56) References Cited

U.S. PATENT DOCUMENTS

2015/0049812 A1* 2/2015 Ovsyannikov ....... H04N 19/513
375/240.16

OTHER PUBLICATIONS

ITU-T H.264, Advanced video coding for generic audiovisual services, Series H Audiovisual and Multimedia Systems, Infrastructure of audiovisual services—Coding of moving video, Apr. 2013, Telecommunication Standardization Sector of ITU.

* cited by examiner

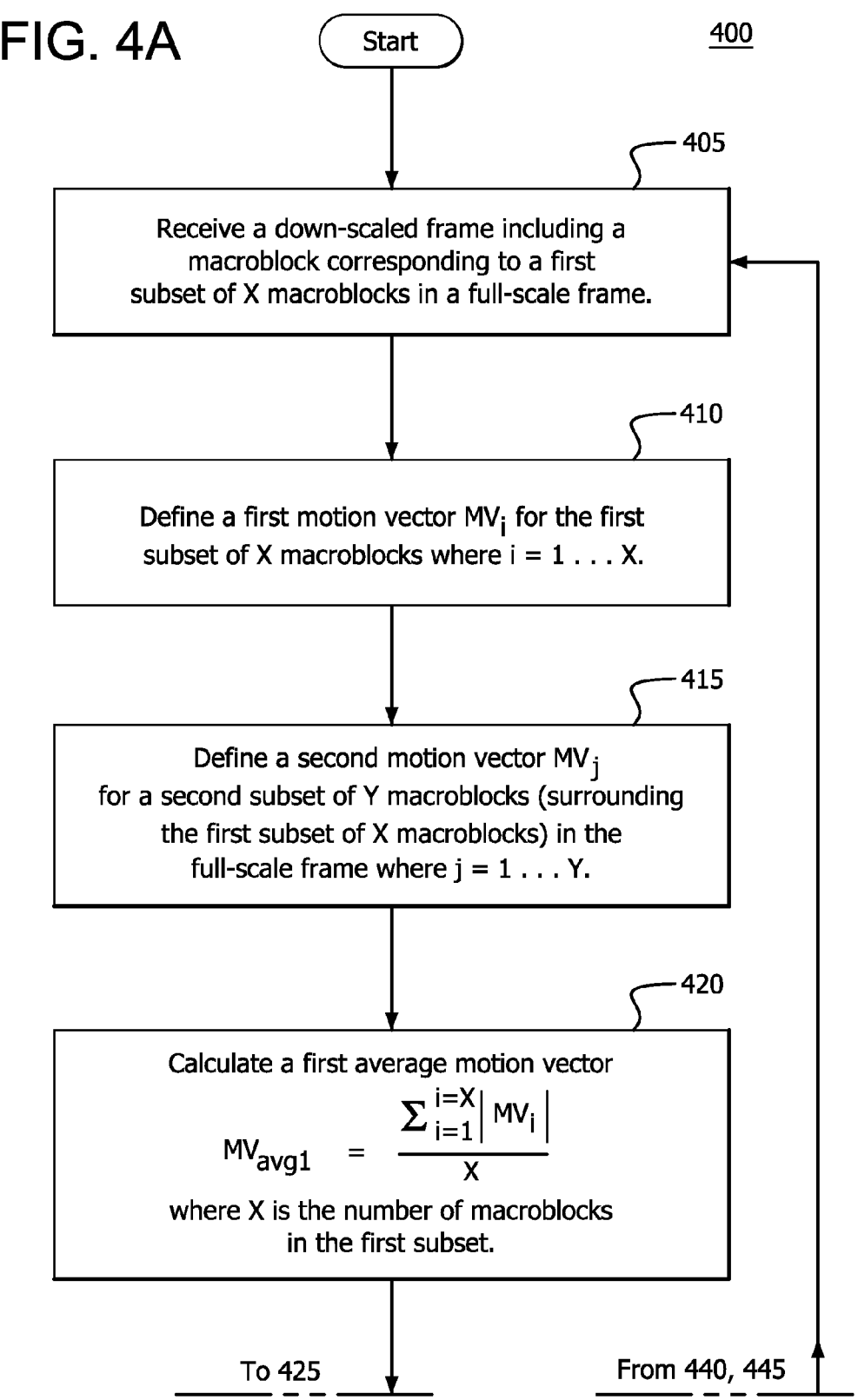

PERFORMING VIDEO ENCODING MODE DECISION BASED ON MOTION ACTIVITY

TECHNICAL FIELD

The disclosed embodiments are generally directed to video processing techniques performed by an encoder.

BACKGROUND

H.264 is an advanced video coding (AVC) standard for video compression, and is currently one of the most commonly used formats for the recording, compression, and distribution of high definition video. Transcoding is the direct digital-to-digital data conversion of one multimedia encoding to another, such as for movie data files or audio files. This is typically performed in cases where a target device (or workflow) does not support the format or has limited storage capacity that mandates a reduced file size, or to convert incompatible or obsolete data to a better-supported or modern format. Transcoding may be performed at various times such as, for example, while files are being searched or when files are prepared for presentation.

H.264-based video transcoding with spatial resolution conversion may be performed by decoding a compressed bitstream, down-sampling the decoded video sequence, and then encoding the down-scaled video data with an H.264 encoder. However, the encoding process associated with H.264-based video transcoding is highly complex. For example, a motion compensated prediction used during the encoding process may be time consuming and involve complex motion search and mode decision algorithms.

A coded video sequence in H-264/AVC consists of a sequence of coded pictures. Each coded picture may represent an entire frame or a single field. The coded picture is partitioned into fixed-size macroblocks that cover a rectangular picture area of samples, (e.g., 16×16 samples, 8×8 samples, and the like).

In a typical encoding process, a rate distortion optimization technique may be used to determine encoding mode decision information, whereby for each macroblock, all of the supported modes may be looped over, (skip, inter 16×16, inter 16×8, inter 8×16, inter 8×8, inter 8×4, inter 4×8, inter 4×4, intra 16×16, intra 8×8 and intra 4×4), are used to calculate the rate distortion cost and select the best mode which has the minimum rate distortion cost. However, this encoding process is significantly time consuming.

SUMMARY OF EMBODIMENTS

Some embodiments may provide a method and apparatus for performing video encoding mode decisions. A down-scaled frame is received that includes a macroblock corresponding to a first subset of macroblocks of a first area in a full-scale frame. A first average motion vector is calculated for the first subset of macroblocks, and a second average motion vector is calculated for a second subset of macroblocks of a second area surrounding the first subset of macroblocks. A comparison of a threshold to a distance measure between absolute values of the first and second average motion vectors is performed. A prediction mode for the macroblock in the down-scaled frame is determined based on the comparison to generate predicted blocks.

Some embodiments may provide a motion compensation unit including an input configured to receive a down-scaled frame that includes a macroblock corresponding to a first subset of macroblocks in a full-scale frame. The motion compensation unit further includes an output configured to provide predicted blocks based on a first average motion vector determined for the first subset of macroblocks, and a second average motion vector for a second subset of macroblocks in the full-scale frame.

Some embodiments may provide a non-transitory computer-readable storage medium that may be configured to store a set of instructions that, when executed by at least one processor, perform a portion of a process to fabricate a semiconductor device including an input configured to receive a down-scaled frame that includes a macroblock corresponding to a first subset of macroblocks in a full-scale frame. The motion compensation unit further includes an output configured to provide predicted blocks based on a first average motion vector determined for the first subset of macroblocks, and a second average motion vector for a second subset of macroblocks in the full-scale frame.

The instructions may be Verilog data instructions, hardware description language (HDL) instructions, or software or firmware instructions.

Some embodiments may provide an apparatus comprising a receiver for receiving a request for transcoding a multimedia file, a storage storing a down-scaled frame that includes a macroblock corresponding to a first subset of macroblocks in a full-scale frame, and a video encoder. The video encoder may be adapted to determine a first motion vector for the first subset of macroblocks, determine a second motion vector for a second subset of macroblocks in the full-scale frame, calculate a first average motion vector based on the first subset of macroblocks, calculate a second average motion vector based on the second subset of macroblocks, and generate predicted blocks based on the first and second average motion vectors.

The video encoder may be further adapted to perform a comparison of a threshold to a distance measure between absolute values of the first and second average motion vectors.

The apparatus may further comprise a network transmitter adapted to transmit the predicted blocks to another apparatus.

BRIEF DESCRIPTION OF THE DRAWINGS

A more detailed understanding may be had from the following description, given by way of example in conjunction with the accompanying drawings wherein:

FIGS. 4A and 4B, taken together, are a flow diagram of a procedure for determining which encoding modes to use to process macroblocks in down-scaled frames in accordance with some embodiments.

DETAILED DESCRIPTION OF EMBODIMENTS

Embodiments are described for implementing a mode decision algorithm based on motion activity, which utilizes motion vector information from original full-scale scenes to predict the possible modes for down-scaled scenes in H.264-based homogeneous video transcoding.

Figure 1:
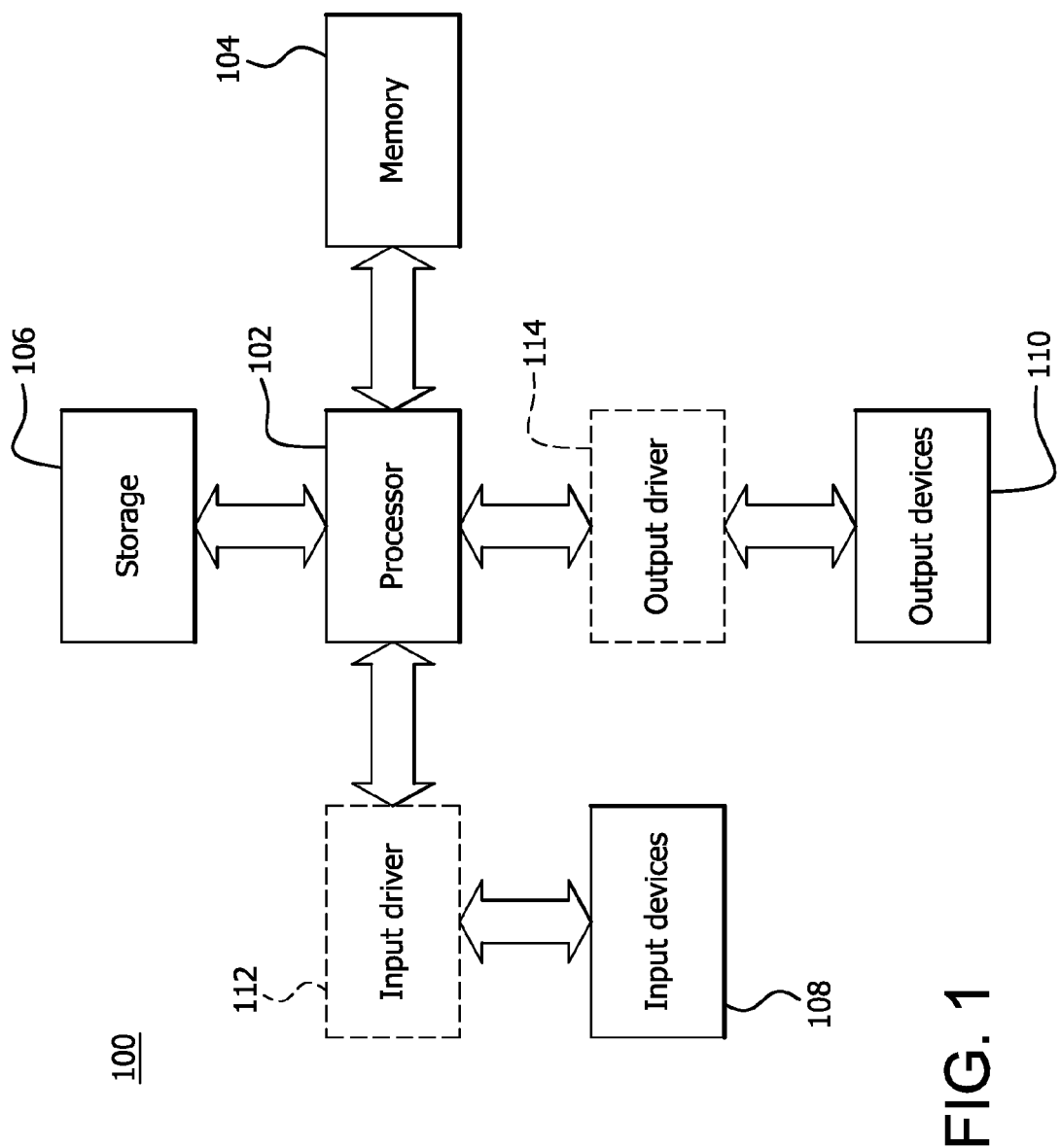
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a server, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

H.264-based homogeneous video transcoding with spatial resolution conversion is described herein to support the wide adoption of H.264-based video transcoding and universal multimedia network access. A motion activity based mode decision algorithm may be implemented by, for example, the processor 102 of FIG. 1, to utilize the motion information from original full-scale scenes to efficiently predict the encoding modes for down-scaled scenes in order to speed up the re-encoding process, which in turn improves the overall transcoding performance.

The video color space used by H.264/AVC separates a color representation into a luma (i.e., luminance) component Y, which represents brightness, and chroma (i.e., chrominance) components Cb and Cr, which represent the extent to which the color deviates from gray towards blue and red, respectively.

Each macroblock may be encoded in one of several supported prediction modes. For example, intra and inter prediction modes may be used. An exhaustive rate distortion optimization process may be performed for each macroblock in down-scaled scenes to find its best prediction mode during the encoding process. Alternatively, the prediction modes may be blindly limited to avoid the exhaustive motion compensated prediction process during the encoding process, such as disabling inter sub-macroblock partition modes, (e.g., inter 8×4, inter 4×8 and inter 4×4), and/or turning off the small size intra prediction mode (intra 4×4). However, the video quality may be degraded as there may be some high motion and rich texture areas which need to be encoded using small prediction modes so as to keep more content details for visual quality.

In one embodiment, a mode decision algorithm based on motion activity is implemented which utilizes motion vector information from original full-scale scenes to predict the possible modes for down-scaled scenes in H.264-based homogeneous video transcoding. With the proposed mode decision method, motion search is performed only on the predicted modes to calculate the rate distortion cost. The most popular rate distortion optimization formulation uses the Lagrangian multiplier as follows:

$$J(m)=D(m)+\lambda*R(m);$$　　　　　　　　Equation (1)

where $J(m)$ is the rate distortion cost for coding a macroblock in mode m, $D(m)$ is the distortion between the original and the reconstructed macroblock, R is the total bits (rate) to encode the macroblock, and $\lambda$ is the Lagrangian multiplier. With the proposed mode decision method, the overall encoding time may be dramatically optimized, while keeping a high fidelity to the original exhaustive rate distortion optimization mechanism so as not to sacrifice quality or speed.

Figure 2:
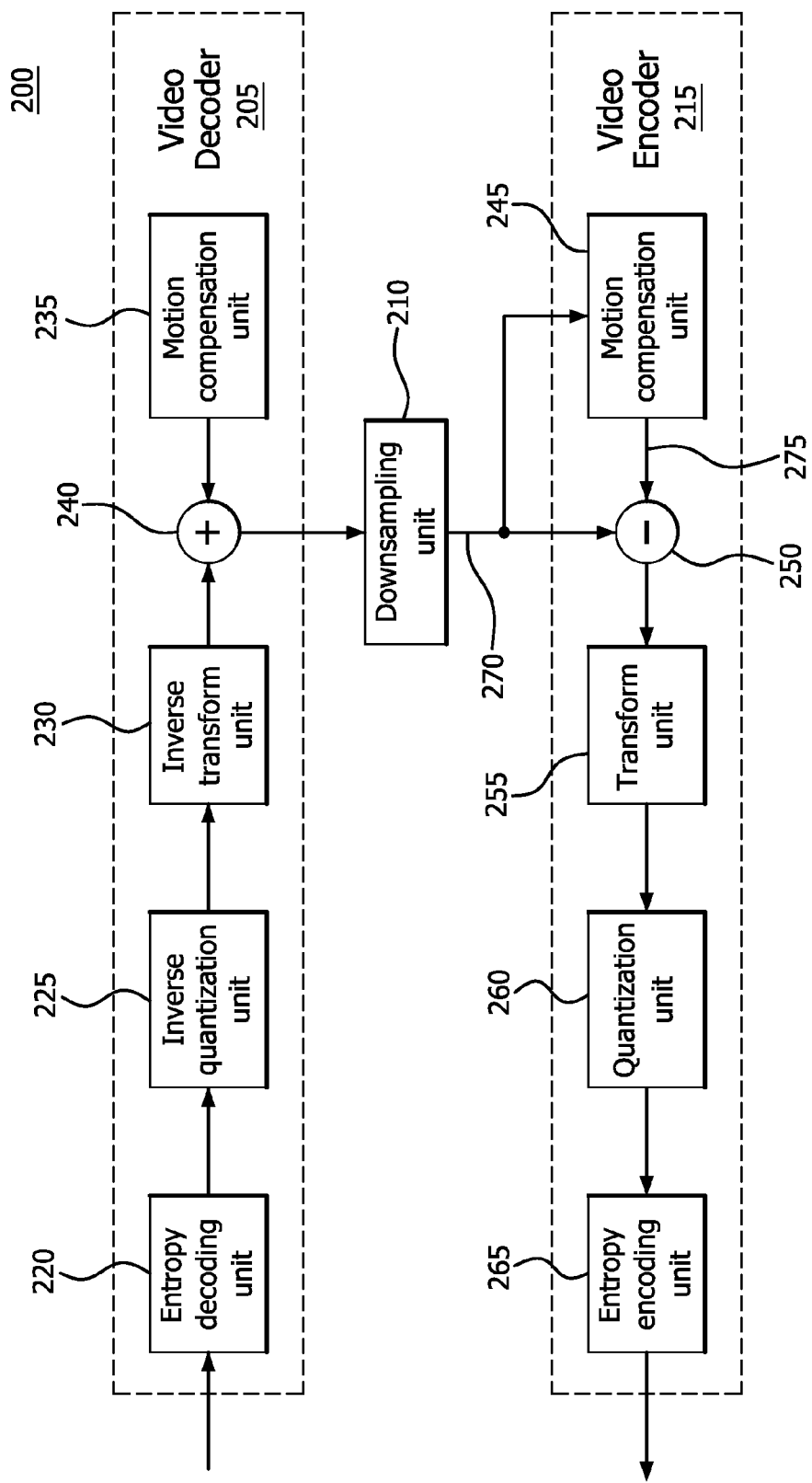
FIG. 2 shows an example of a video transcoding system in accordance with some embodiments.

FIG. 2 shows a video transcoding system 200 including a video decoder 205, a downsampling unit 210 and a video encoder 215. Each of the video decoder 205 and the video encoder 215 may include a processor in communication with a memory, similar to the processor 102 and the memory 104 shown in FIG. 1.

As shown in FIG. 2, the video decoder 205 includes an entropy decoding unit 220, an inverse quantization unit 225, an inverse transform unit 230, a motion compensation unit 235 and an adder 240. The video encoder 210 includes a motion compensation unit 245, a subtractor 250, a transform unit 255, a quantization unit 260 and an entropy encoding unit 265. The input 270 to the motion compensation unit 245 includes original input frames and reference frames. The motion compensation unit 245 performs inter/intra prediction and mode decisions to obtain the best prediction for a current macroblock. The input 270 may include down-scaled input and reference frames, as well as motion vector information associated with the corresponding full-scale frames. The motion compensation unit 245 outputs predicted blocks 275.

Still referring to FIG. 2, the subtractor 250 outputs the difference between the original blocks in the input 270 and the predicted blocks 275 to the transform unit 255, which performs a transform on pixel domain motion compensated residue data to generate transform domain residue in order to de-correlate the residue data. The quantization unit 260 further compresses the residue data in the transform domain. The entropy encoding unit 265 converts a series of symbols representing elements of the encoded video sequence into a compressed bitstream suitable for transmission or storage.

H.264-based video transcoding with spatial resolution conversion may be performed by the video decoder 205 decoding a compressed bitstream including at least one original full-scale frame to obtain motion vector information. The downsampling unit 210 downsamples a decoded video sequence received from the video decoder 205. The input 270 to the motion compensation unit 245 may correspond to the down-scaled frame. The motion compensation unit 245 encodes the input 270 and outputs predicted blocks 275.

In the case of homogeneous video transcoding from H.264 to H.264 with spatial resolution conversion, the motion vector information obtained from decoding the original full-scale frames and the mode information used to effectively compress the down-scaled frames are highly correlated. Typically, a bottleneck in transcoding may be caused by the video encoder 215 making motion compensated predictions for generating the predicted blocks 275. Hence, it is desired to utilize the motion vector information from the original compressed video to speed up the motion compensated prediction process of the encoding procedure for the down-scaled frames.

In one embodiment, the prediction mode may be estimated for each marcoblock in the downsized frames by using the motion search result of the original full-scale pictures, as opposed to a blind and independent rate distortion optimization on the original and the down-scaled scenes.

Statistical results show that most of the areas of motionless video content are predicted as skip mode and inter 16×16 mode in order to save coding bits. The probability of occurrence of skip and inter 16×16 modes in the encoded motionless video sequences, based on statistical averaging, takes about 80~90%. In contrast to the motionless case, for the sequences with big motion information, the average percentage of selecting skip and inter 16×16 modes as the best mode is over 50%. As a result, if the skip or inter 16×16 modes are determined early without performing an exhaustive rate distortion cost calculation, the processing time can be reduced dramatically. Thus, an early termination condition for the video encoder 215 may be used to bypass a lengthy mode calculation process, without sacrificing video quality.

Based on the fact that large mode sizes such as skip and inter 16×16 are always chosen for macroblocks in the smooth video content, while other smaller mode sizes are chosen for macroblocks in the video content with big motion, the idea is to learn the boundary region from the mode decision results of the original full-scale frames by analyzing the motion vector information, and use the boundary information to assist with the mode decision process for the down-scaled frames. If there are a sufficient number of boundary regions, the macroblock is expected to have a big motion.

Figure 3:
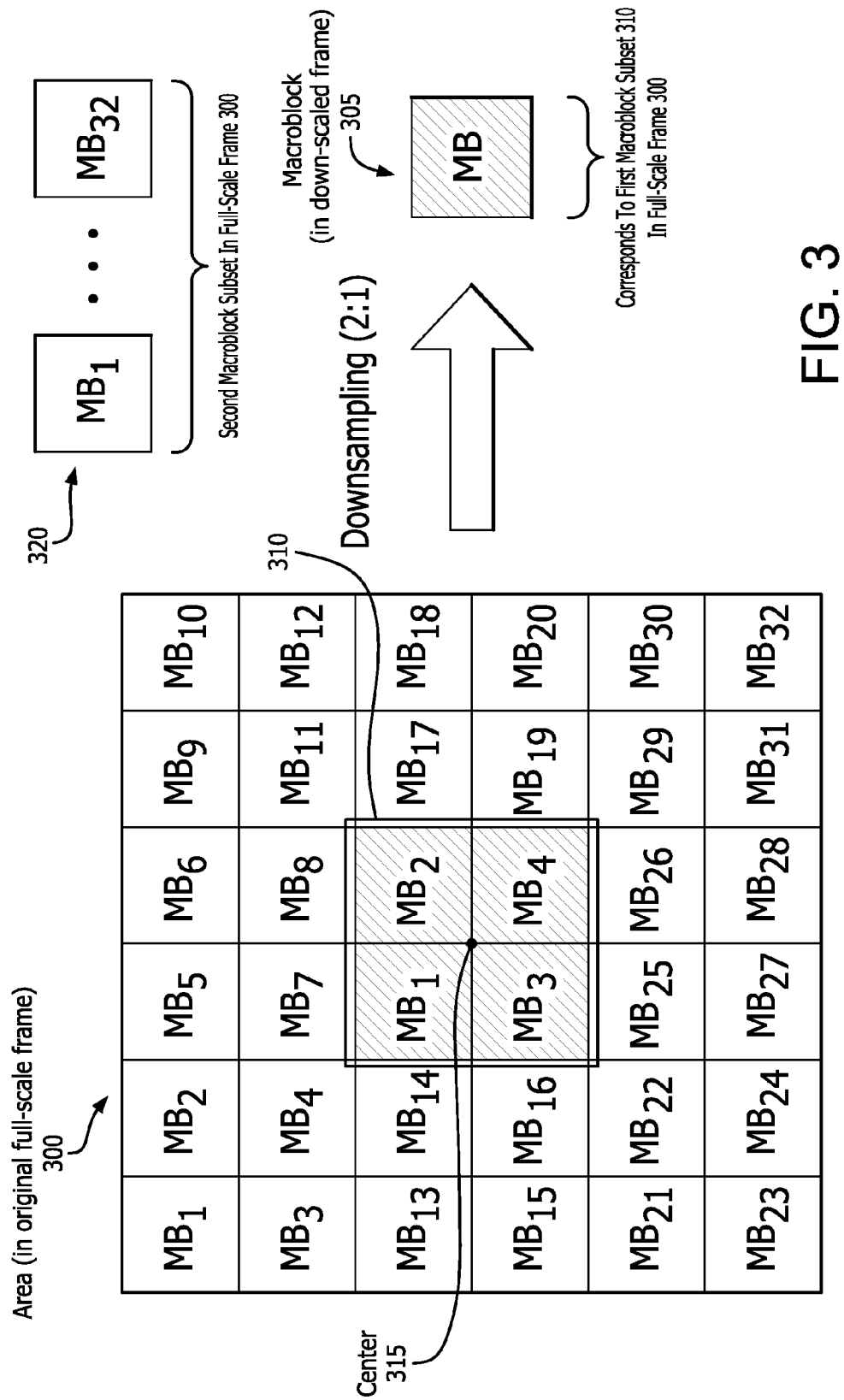
FIG. 3 shows an example of a macroblock correlation between a full-scale picture and a down-scaled picture.

FIG. 3 shows an example of the mode decision algorithm. To identify the boundary region of one macroblock in the down-scaled picture, motion vectors of the corresponding macroblocks are analyzed from the original full-scale picture. As shown in the example of FIG. 3, an area 300 in an original full-scale frame is downsampled by a factor of 2 in both horizontal and vertical directions to a macroblock 305 in a down-scaled area. The macroblock 305 corresponds to a first macroblock set 310 in the area 300 in the original full-scale frame. In this example, the first subset 310 includes four macroblocks, (from $MB_1$ to $MB_4$), that are adjacent to a selected point (e.g., the center 315) of the area 300 in the original full-scale frame. The neighboring macroblocks of the first subset 310 are numbered as $MB_1$ to $MB_{32}$ and form a second subset 320 in the area 300 in the original full-scale frame. $MV_i$ (i=1 . . . 4) is defined as the motion vector for the first macroblock subset 310, and $MV_j$ (j=1 . . . 32) is defined as the motion vector for the second macroblock subset 320. If the macroblock is coded in multiple subpartitions, the motion vector from the partition which is closer the center 315 of all of the macroblocks is selected. For example, if $MB_{17}$ is coded in inter 16×8 mode, the motion vector of the lower 16×8 partition is selected as the motion vector for $MB_{17}$. A partition refers to a sub-block inside of a macroblock. For example, if a macroblock is coded in an inter 16×8 mode, the motion vector of the lower 16×8 partition may be selected as the motion vector for this block.

Two average motion vectors, $MV_{avg1}$ and $MV_{avg2}$ may be calculated. In this example, the average motion vector $MV_{avg1}$ is the average of $MV_i$ (i=1 . . . 4) and is calculated as:

$$MV_{avg1} = \frac{\sum_{i=1}^{4} |MV_i|}{4}. \qquad \text{Equation (2)}$$

$MV_{avg2}$ is the average of $MV_j$ (j=1 . . . 32) and is calculated as:

$$MV_{avg2} = \frac{\sum_{i=1}^{32} |MV_j|}{32}. \qquad \text{Equation (3)}$$

If the distance measure (DM) between absolute values of the average motion vectors $MV_{avg1}$ and $MV_{avg2}$ is larger than the threshold $TH_{mv}$, then:

$$|MV_{avg1} - MV_{avg2}| \geq TH_{mv}. \qquad \text{Equation (4)}$$

Since this is regarded to be part of the boundary area (big motion case), then for the corresponding macroblock in the down-scaled area, the rate distortion costs may be optimized among all of the supported modes, as the motion vector information from the original full-scale frame suggests that a long motion vector is being pointed to. Otherwise, if DM is not greater than $TH_{mv}$, this is not the big motion case and the rate distortion optimization assessment may be limited to only inter 16×16 and skip modes.

In the real implementation, the macroblock numbers from the original full-scale frame that are involved in the calculation could be different than the example illustrated above to reflect the actual down-sampling factor. The threshold can be initialized based on statistical assessment or a training method through a number of video sequences with different motion/texture information.

The averaging mechanism itself of the motion vectors is a representative illustration to select a threshold, but the mechanism may be more generic to include various heuristics, such as the median calculation of the motion vectors, the number of macroblocks with a motion vector, the signs of motion vectors for adjacent macroblocks, and the like.

Besides motion vectors, other information may also be applicable to detect the edge, such as comparing the number of bits spent in the corresponding macroblocks, the average bits spent for encoding the surrounding macroblocks, and checking the Discrete Cosine Transform (DCT) coefficients, (especially the high frequency coefficients), of the corresponding macroblocks and neighboring macroblocks. Quantization parameter level may serve as an indication as well, since edge information is implicit by low quantization parameters. There are other edge detection algorithms, such as the Sobel method, the Laplace method, and the like. Taking into account the real hardware computation capability and complexity, averaging the surrounding motion vectors in the original full-scale frame is a good candidate here.

An efficient mode decision algorithm for H.264-based homogeneous video transcoding with spatial resolution conversion has been described. Compared to the regular encoding implementation which performs motion compensated prediction on all of the supported modes to select the best prediction mode for every macroblock in the down-scaled frames, this mode decision algorithm effectively uses the motion vector information from the original full-scale frames to simplify the time consuming rate distortion optimization assessment for the downsized pictures. The benefits of such an assessment may benefit, for example, systems with limited processing power, or may assist in the handling of multiple encoding jobs.

Figure 4B:
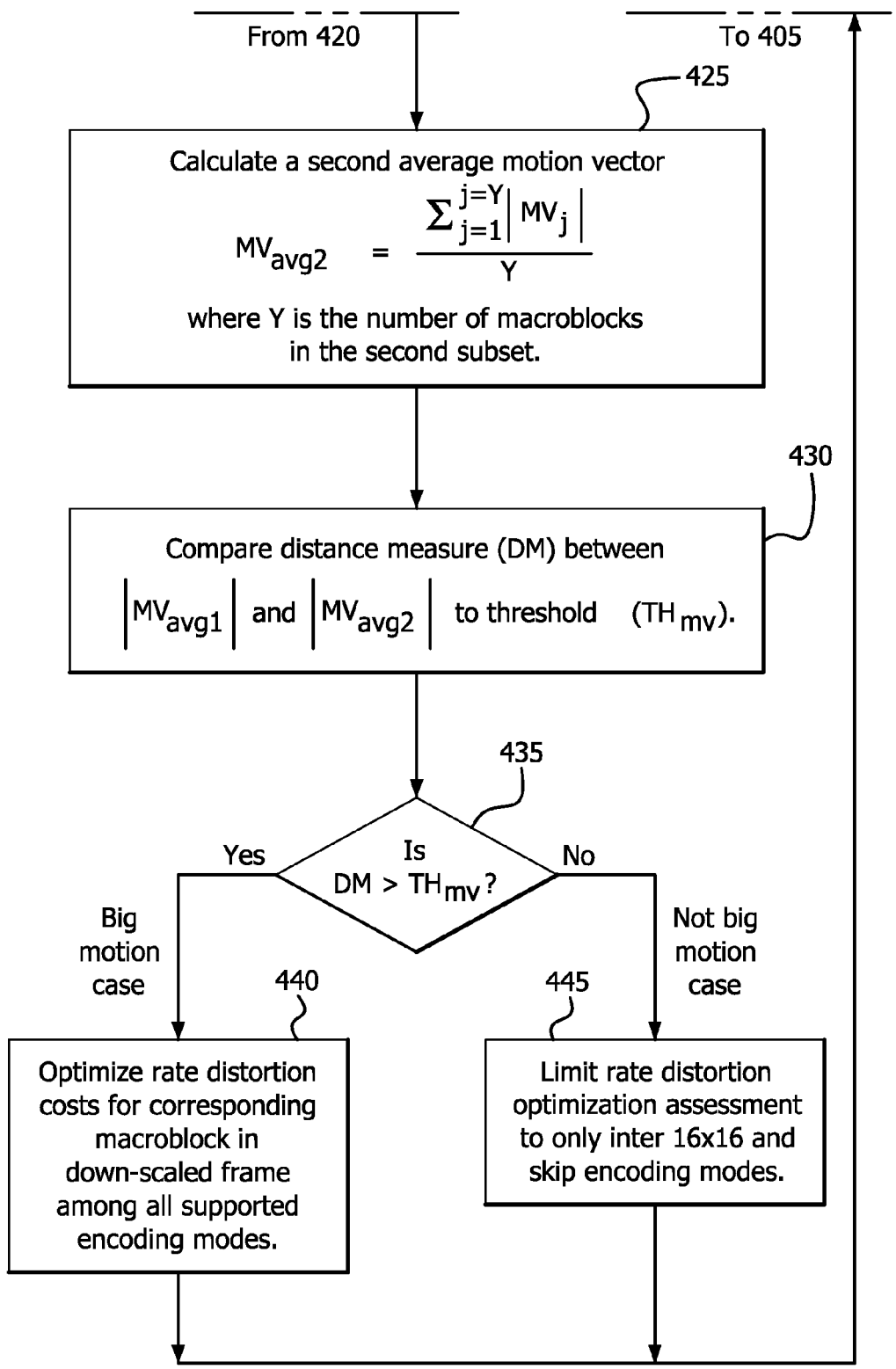

FIGS. 4A and 4B, taken together, are a flow diagram of a procedure 400 for determining which encoding modes to use to process macroblocks in down-scaled frames in accordance with some embodiments.

Referring to FIGS. 2 and 4A, the motion compensation unit 245 in the video encoder 215 receives a down-scaled frame including a macroblock corresponding to a first subset of X macroblocks in a full-scale frame (405 in FIG. 4A). A first motion vector $MV_i$ is defined for the first subset of X macroblocks where where i=1 . . . X (410 in FIG. 4A). A second motion vector $MV_j$ is defined for a second subset of Y macroblocks (surrounding the first subset of X macroblocks) in the full-scale frame where j=1 . . . Y (415 in FIG. 4A).

A first average motion vector $MV_{avg1}$ is calculated, where:

$$MV_{avg1} = \frac{\sum_{i=1}^{i=X} |MV_i|}{X}; \quad \text{Equation (5)}$$

where X is the number of macroblocks in the first subset (420 in FIG. 4A).

Referring to FIGS. 2 and 4B, a second average motion vector $MV_{avg2}$ is calculated, where:

$$MV_{avg2} = \frac{\sum_{j=1}^{j=Y} |MV_j|}{Y}; \quad \text{Equation (6)}$$

where Y is the number of macroblocks in the second subset (425 in FIG. 4B). The distance measure (DM) between $|MV_{avg1}|$ and $|MV_{avg2}|$ is compared to a threshold $TH_{mv}$ (430 in FIG. 4B). A determination is made as to whether or not $DM > TH_{mv}$ (435 in FIG. 4B). If $DM > TH_{mv}$, indicating that this is a big motion case, then rate distortion costs are optimized for a corresponding macroblock in a down-scaled frame among all supported encoding modes (440 in FIG. 4B). If $DM > TH_{mv}$, indicating that this is not a big motion case, then rate distortion optimization assessment is limited to only inter 16×16 and skip encoding modes, and predicted blocks are generated accordingly (445 in FIG. 4B).

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the disclosed embodiments.

The methods or flow charts provided herein may be implemented in a computer program, software, or firmware incorporated in a computer-readable storage medium for execution by a general purpose computer or a processor. In some embodiments, the computer-readable storage medium does not include transitory signals. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of performing video encoding mode decisions, the method comprising:
   receiving a down-scaled frame that includes a macroblock corresponding to a first subset of macroblocks in a full-scale frame;
   determining a first motion vector for each macroblock of the first subset of macroblocks in the full-scale frame;
   determining a second motion vector for each macroblock of a second subset of macroblocks in the full-scale frame, the second subset being adjacent to and sharing a common border with the first subset of macroblocks in the full-scale frame;
   calculating a first average motion vector of the first subset of macroblocks based on the first motion vectors of the macroblocks of the first subset of macroblocks;
   calculating a second average motion vector of the second subset of macroblocks based on the second motion vectors of the macroblocks of the second subset of macroblocks;
   determining whether a boundary region, indicating a level of motion for the macroblock in the down-scaled frame, exists between the first subset of macroblocks and the second subset of macroblocks based on a difference between the first average motion vector and the second average motion vector; and
   generating a predicted macroblock for the macroblock in the down-scaled frame by: (i) selecting, when the boundary region is determined, an encoding mode from a first number of selectable encoding modes, and performing a rate distortion assessment on each of the first number of selectable encoding modes; and (ii) selecting, when the boundary region is not determined, the encoding mode from a second number of selectable encoding modes and performing a rate distortion assessment on each of the second number selectable encoding modes, the second number of selectable encoding modes being less than the first number of selectable encoding modes.

2. The method of claim 1, wherein the second number of selectable encoding modes includes an inter 16×16 encoding mode and a skip encoding mode and the level of motion indicated by the boundary region is determined not to exist if the absolute value of the difference between the first and second average motion vectors is less than or equal to a threshold.

3. The method of claim 1, wherein the first number of selectable encoding modes includes each of a plurality of supported encoding modes and the level of motion indicated by the boundary region is determined to exist if the absolute value of the difference between the first and second average motion vectors is greater than a threshold.

4. The method of claim 1, wherein the second subset of macroblocks surrounds the first subset of macroblocks on each side of the first subset of macroblocks.

5. A video processing apparatus, for performing video encoding mode decisions, comprising:
a motion compensation unit configured to:
receive a down-scaled frame that includes a macroblock corresponding to a first subset of macroblocks in a full-scale frame;
determine a first motion vector for each macroblock in the first subset of macroblocks in the full-scale frame;
determine a second motion vector for each macroblock in a second subset of macroblocks in the full-scale frame, the second subset being adjacent to and sharing a common border with the first subset of macroblocks;
calculate a first average motion vector of the first subset of macroblocks based on the first motion vectors of the macroblocks of the first subset of macroblocks;
calculate a second average motion vector of the second subset of macroblocks based on the second motion vectors of the macroblocks of the second subset of macroblocks;
determine whether a boundary region, indicating a level of motion for the macroblock in the down-scaled frame, exists between the first subset of macroblocks and the second subset of macroblocks based on a difference between the first average motion vector and the second average motion vector; and
provide a predicted macroblock for the macroblock in the down-scaled frame by: (i) selecting, when the boundary region is determined, an encoding mode from a first number of selectable encoding modes, and performing a rate distortion assessment on each of the first number selectable encoding modes; and (ii) selecting, when the boundary region is not determined, the encoding mode from a second number of selectable encoding modes and performing a rate distortion assessment on each of the second number selectable encoding modes, the second number of selectable encoding modes being less than the first number of selectable encoding modes.

6. The video processing apparatus of claim 5, wherein the motion compensation unit is further configured to:
determine whether the boundary region, indicating the level of motion for the macroblock in the down-scaled frame, exists by comparing a threshold to an absolute value of the difference between the first average motion vector and the second average motion vector.

7. The video processing apparatus of claim 6, wherein the second number of selectable encoding modes includes an inter 16×16 encoding mode and a skip encoding mode and the level of motion indicated by the boundary region is determined not to exist if the absolute value of the difference between the first and second average motion vectors is less than or equal to a threshold.

8. The video processing apparatus of claim 6, wherein the first number of selectable encoding modes includes each of a plurality of supported encoding modes and the level of motion indicated by the boundary region is determined to exist if the absolute value of the difference between the first and second average motion vectors is greater than a threshold.

9. The video processing apparatus of claim 5, wherein the second subset of macroblocks surrounds the first subset of macroblocks on each side of the first subset of macroblocks.

10. A non-transitory computer-readable storage medium configured to store a set of instructions that, when executed, configure a manufacturing process used to manufacture a semiconductor device comprising:
a motion compensation unit configured to:
receive a down-scaled frame that includes a macroblock corresponding to a first subset of macroblocks in a full-scale frame;
determine a first motion vector for each macroblock in the first subset of macroblocks in the full-scale frame;
determine a second motion vector for each macroblock in a second subset of macroblocks in the full-scale frame, the second subset being adjacent to and sharing a common border with the first subset of macroblocks;
calculate a first average motion vector of the first subset of macroblocks based on the first motion vectors of the macroblocks of the first subset of macroblocks;
calculate a second average motion vector of the second subset of macroblocks based on the second motion vectors of the macroblocks of the second subset of macroblocks;
determine whether a boundary region, indicating a level of motion for the macroblock in the down-scaled frame, exists between the first subset of macroblocks and the second subset of macroblocks based on a difference between the first average motion vector and the second average motion vector; and
provide a predicted macroblock for the macroblock in the down-scaled frame by: (i) selecting, when the boundary region is determined, an encoding mode from a first number of selectable encoding modes, and performing a rate distortion assessment on each of the first number selectable encoding modes; and (ii) selecting, when the boundary region is not determined, the encoding mode from a second number of selectable encoding modes and performing a rate distortion assessment on each of the second number selectable encoding modes, the second number of selectable encoding modes being less than the first number of selectable encoding modes.

11. The non-transitory computer-readable storage medium of claim 10 wherein the instructions are Verilog data instructions.

12. The non-transitory computer-readable storage medium of claim 10 wherein the instructions are hardware description language (HDL) instructions.

13. The non-transitory computer-readable storage medium of claim 10, wherein the motion compensation unit is further configured to:
determine whether the boundary region, indicating the level of motion for the macroblock in the down-scaled frame, exists by comparing a threshold to an absolute value of the difference between the first average motion vector and the second average motion vector.

14. The non-transitory computer-readable storage medium of claim 13 wherein the second number of selectable encoding modes includes an inter 16×16 encoding mode and a skip encoding mode and the level of motion indicated by the boundary region is determined not to exist if the absolute value of the difference between the first and second average motion vectors is less than or equal to a threshold.

15. The non-transitory computer-readable storage medium of claim 13, wherein the first number of selectable encoding modes includes each of a plurality of supported encoding modes and the level of motion indicated by the boundary region is determined to exist if the absolute value of the difference between the first and second average motion vectors is greater than a threshold.

16. The non-transitory computer-readable storage medium of claim 10 wherein the second subset of macroblocks surrounds the first subset of macroblocks on each side of the first subset of macroblocks.

17. The non-transitory computer-readable storage medium of claim 13 wherein a prediction mode is determined for the macroblock in the down-scaled frame based on the comparison.

18. The method of claim 1, wherein the predicted macroblock is generated without receiving an indication of encoding modes used to previously encode the macroblocks of the first subset of macroblocks in the full-scale frame corresponding to the macroblock in the down-scaled frame.

\* \* \* \* \*